May 9, 1944.  C. I. AUTEN  2,348,589
FASTENING MEANS
Filed May 24, 1943
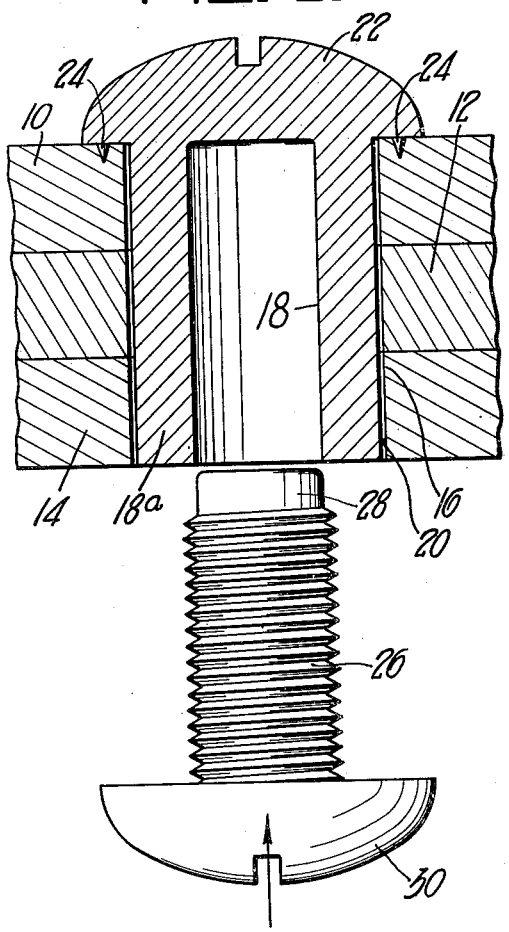
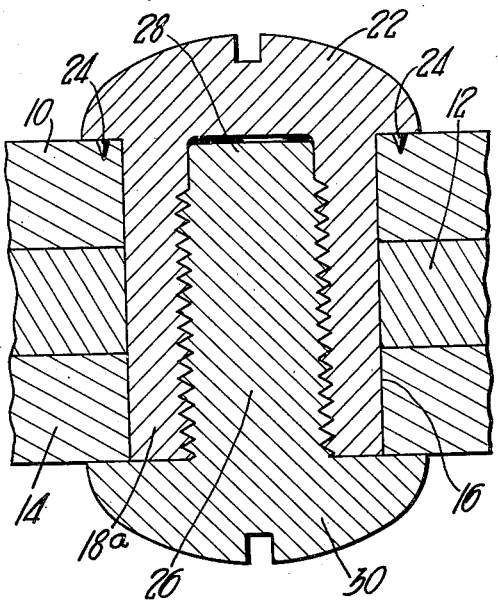
INVENTOR:
CLAUDE I. AUTEN,
BY: John E. Jackson
HIS ATTORNEY.

Patented May 9, 1944

2,348,589

UNITED STATES PATENT OFFICE 2,348,589

FASTENING MEANS

Claude I. Auten, Birmingham, Ala., assignor to Tennessee Coal, Iron and Railroad Company, a corporation of Tennessee Application May 24, 1943, Serial No. 488,251

2 Claims. (Cl. 85—2.4)

The present invention relates to improvements in fastening means for securing workpieces together, which means may take the form of a relatively soft metal sleeve adapted to be freely inserted in a bore of one or more pieces, the sleeve being combined with a self-tapping screw of relatively hard metal formed with threads which are adapted to embed themselves in the sleeves and expand the same into a condition of compressive engagement with said bore.

One object of the invention is to provide an improved fastening device comprising simple elements of sleeve-like form cooperating with self-threading or tapping screws.

A further object is to provide means in such combination effective to expand one of the members so as to prevent it from turning relative to the workpiece.

Another object is to provide a sleeve of relatively soft metal adapted to be acted upon by a self-tapping screw of relatively harder metal, the threads of which screw are of an exterior diameter slightly greater than the inside diameter of the sleeve and in which said screw is provided with a pilot portion of a diameter a trifle smaller than the inside diameter of this sleeve.

A further object is to provide for a relatively soft metal sleeve such as above mentioned, adapted to form a protective shield to enclose the end of the screw.

Another object is to combine and coordinate the various components herein illustrated and described so that they singly and jointly contribute to the attainment of the functions and results set forth.

The features and advantages of the invention will be fully apparent from a consideration of the following disclosure when read in connection with the accompanying drawing, in which:

Figure 1 is an enlarged longitudinal section through the component elements of the device embodying the invention in the positions which they occupy prior to the assembly of the parts.

Figure 2 is a similar sectional view illustrating the parts tightly screwed together in the final assembled position.

Referring in detail to the drawing, 10, 12, and 14 represent three workpieces adapted to be secured together. The workpieces are provided with a bore 16 of a diameter slightly greater than the normal external diameter of the sleeve 18, thus providing a clearance space 20 to facilitate the free insertion of the sleeve into the bore. The sleeve 18 may be of relatively soft metal such as brass or copper or low-carbon mild steel or its equivalent, and it will usually be formed with an enlarged work-engaging head 22. In some cases this head may be provided with a series of prongs 24 adapted to dig into the workpiece sufficiently to prevent relative turning of the sleeve prior to the engagement of the mating part to be hereinafter described. It is understood, however, that in some cases these prongs may be omitted. If desired, the head 22 may be made of metal relatively harder than the sleeve portion 18 or the head could be case-hardened and the sleeve left in an unhardened or relatively softer state so as to facilitate expansion thereof by the mating action of the threaded shank 26 of a self-tapping type of screw as shown. This screw will preferably be made of metal relatively harder than the sleeve 18; for example, the screw can be of steel case-hardened. Such a self-tapping screw is preferably formed with a pilot extension 28 on the extremity thereof whose diameter is slightly less than the interior diameter of the sleeve 18 so as to facilitate initial engagement of the shank of the screw with the central cavity of the sleeve. If desired, the pilot portion 28 may be tapered. The self-tapping screw will be formed with a head 30 of round slotted form shown or of polygonal pattern to permit engagement with a conventional wrench.

When the threaded shank of the self-tapping screw 26 is screwed home into the ultimate position of Figure 2, the threads cut into the body of the sleeve and thus may be said to tap mating threads in the inner cavity wall of the sleeve. As this assembling action takes place, the sleeve is first expanded in the region of one extremity 18ª remote from the head 22, thus preventing turning of the sleeve. As the screw is turned toward its ultimate position, the expanding action takes place progressively so that when the parts are finally screwed home to the ultimate position illustrated in Figure 2, the shell-like body of the sleeve is expanded to such an extent that the clearance space 20 suggested in Figure 1 is entirely eliminated, thus causing the entire superficial cylindrical surface area of the sleeve to make a snug tight fit with the bore 16 formed in the workpieces. Therefore, after the parts are assembled to the condition in Figure 2, all the parts thereof are adequately held in such a firm manner as to prevent the same from becoming dislodged by vibration or other forces acting thereon.

Various modifications and changes in detailed aspects of the described construction may be made within the scope of the appended claims.

I claim:

1. Fastening means for securing workpieces together, comprising a relatively soft metal sleeve having a continuous cylindrical unbroken wall integral with an enlarged head closing one end thereof, and a self-tapping screw of relatively hard metal whose threads when screwed into the sleeve are effective to embed themselves in said unbroken wall and expand and distort it outwardly to a condition of tight compressive engagement with a bore formed in said workpieces.

2. Fastening means for securing workpieces together, comprising a relatively soft metal sleeve having a continuous cylindrical unbroken wall adapted to be freely inserted in a clearance bore formed in said pieces and having an enlarged head closing one end of the sleeve and engaging one of said pieces, said head being of metal harder than said sleeve, and a self-tapping screw of relatively hard metal whose threads are effective to embed themselves in said sleeve and expand and distort it to a condition of tight compressive engagement with said bore.

CLAUDE I. AUTEN.